US006875411B2

(12) United States Patent
Sanfilippo et al.

(10) Patent No.: US 6,875,411 B2
(45) Date of Patent: Apr. 5, 2005

(54) PROCESS FOR THE PRODUCTION OF HYDROGEN

(75) Inventors: Domenico Sanfilippo, Paullo (IT); Alberto Paggini, Spino D'Adda (IT); Valerio Piccoli, Monza (IT); Roberta Miglio, Oleggio (IT); Stefano Rossini, Milan (IT)

(73) Assignee: Snamprogetti, S.p.A., San Donato Milanese (IT)

( * ) Notice: Subject to any disclaimer, the term of this patent is extended or adjusted under 35 U.S.C. 154(b) by 137 days.

(21) Appl. No.: 09/810,561

(22) Filed: Mar. 19, 2001

(65) Prior Publication Data

US 2001/0055559 A1 Dec. 27, 2001

(30) Foreign Application Priority Data

Mar. 17, 2000 (IT) .................................... MI2000A0551
Dec. 21, 2000 (IT) .................................... MI2000A2775

(51) Int. Cl.[7] ............................ C01B 3/02; C01B 3/06; C01B 3/08; C01B 3/10; C01B 31/20

(52) U.S. Cl. ............................... 423/437.1; 423/648.1; 423/657; 423/658

(58) Field of Search .......................... 423/648.1, 437.1, 423/657, 658

(56) References Cited

U.S. PATENT DOCUMENTS 3,442,620 A * 5/1969 Huebler et al. .......... 423/648.1
4,216,199 A * 8/1980 Erickson ..................... 423/657
5,339,754 A * 8/1994 Lyon .......................... 110/345
5,509,362 A * 4/1996 Lyon .......................... 110/345
5,690,902 A * 11/1997 Werth ......................... 423/658
5,830,426 A * 11/1998 Werth ......................... 423/658
5,840,270 A * 11/1998 Werth ......................... 423/658
6,007,699 A * 12/1999 Cole ...................... 423/648.1
6,143,203 A * 11/2000 Zeng et al. ................. 252/373
6,620,398 B2 * 9/2003 Kindig et al. ............... 423/657
6,682,714 B2 * 1/2004 Kindig et al. ............... 423/657
6,790,430 B1 * 9/2004 Lackner et al. .......... 423/648.1

* cited by examiner

*Primary Examiner*—Wayne A. Langel
(74) *Attorney, Agent, or Firm*—Oblon, Spivak, McClelland, Maier & Neustadt, P.C.

(57) ABSTRACT

Process for the production of hydrogen consisting in subjecting a solid to oxidation and treating, in a different zone, the oxidized form thus produced with a reducing stream, preferably a hydrocarbon.

21 Claims, 5 Drawing Sheets

Separation section
R3 and/or R2
4c2 ⟹ 4c2/1 - 4c2/2
CH4 + CO/H2
AD1
H2/CO
4c3 ⟹ 2
M1
4c
CO2
4b
R3 and/or R2
4c1/1 - 4c1/2
CH4 + H2 + CO
4'
E1
H2O
4a
4
CO2 + H2O
CH4 + H2 + CO

PROCESS FOR THE PRODUCTION OF HYDROGEN

The present invention relates to a process for the production of hydrogen which basically consists in subjecting a solid to oxidation and treating the oxidized form thus produced with a hydrocarbon: the overall reaction leads to the formation of hydrogen or a species which can be easily transformed into hydrogen, as well as $CO_2$ which is obtained in a stream at a high concentration, which can be eliminated in exhausted reservoirs or in the ocean.

It is known that hydrogen is formed as the product of numerous chemical reactions, some of which are used for its preparation. In processes which are more interesting from an industrial point of view, the process starts from hydrocarbons or coal. Hydrogen is obtained from hydrocarbons by means of various pyrolysis and cracking processes and substantially in refineries from catalytic reforming, or in petrochemistry from synthesis gases ($CO+H_2$), produced, in turn, by the reaction of hydrocarbons with vapour (steam reforming) or with oxygen (partial oxidation).

The steam reforming reaction of methane gas $$CH_4+H_2O_{vap}\rightarrow CO+3H_2$$

is endothermic and is generally effected at very high temperatures.

The first reforming step is followed by the introduction of vapour for the shift conversion steps (high and low temperature), decarbonation by means of washing, as well as the subsequent purification of $H_2$, from residual CO, by means of methanation. In more advanced plants, after the first shift conversion step (at high temperature), a PSA (Pressure Swing Adsorption) unit allows the direct separation of $H_2$.

The efficiency and investment costs of a plant for the production of $H_2$ are mainly influenced by the $H_2O/CH_4$ ratio, the outlet temperature of the reforming step (800–900° C.), configuration of the shift conversion section, preheating of air and efficiency of the PSA unit.

The direct partial oxidation of methane to synthesis gas $$CH_4+1/2O_2\rightarrow CO+2H_2$$

can also take place at a modest temperature but the selectivity of the reaction, which is difficult to control owing to the presence of the complete combustion reaction, hinders its industrial application.

A process is now becoming widely used, which comprises the combustion of methane to $CO_2$ and $H_2O$ contemporaneously with the reforming reaction of $CH_4$, which has not reacted, with $H_2O$ and $CO_2$ (autothermal reforming), so that the exothermicity of one reaction is balanced by the endothermicity of the other. In the latter case, there is the disadvantage however of using pure oxygen for the combustion of methane, which requires the running of an auxiliary cryogenic unit for the separation of oxygen from the air.

The state of the art which illustrates the above is vast, and reference is made herein to the introductive part of U.S. Pat. No. 4,888,131, as an index and summary thereof.

It is known that the importance of $H_2$ lies in the fact that this gas is used both in oil refining (hydrocracking, hydrotreating) and in petrochemistry (synthesis of MeOH, DME, $NH_3$, hydrocarbons via Fischer-Tropsch).

The reformulation process of fuels currently adopted and the extremely strict specifications on product quality and sulfur content in diesel, will lead to an ever-increasing request for $H_2$ on the part of refineries. In addition, there is also an increasing interest in the use of hydrogen as energy vector for its potential "clean fuel" characteristics, as it does not create harmful emissions, and does not produce $CO_2$.

The Applicant has now found a technologically advanced and industrially feasible solution for the production of hydrogen with a high purity, from water and natural gases, and with the transformation of the carbon in the hydrocarbon substantially to $CO_2$ in a high concentration stream without inert products.

Figure 1:
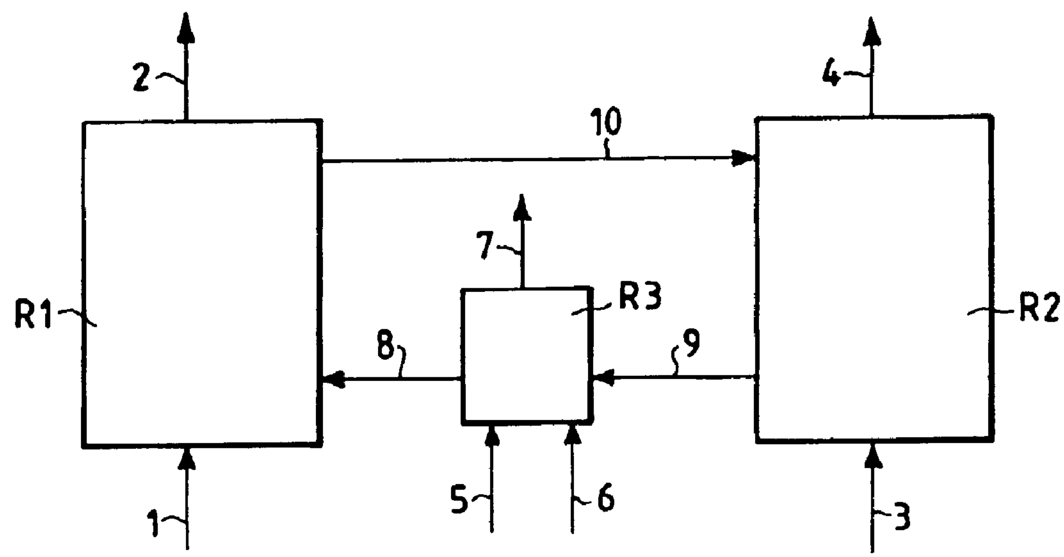
FIG. 1 shows a first embodiment of the process of the invention.

A characteristic of the process is the production of gas in separate zones in order to avoid being restricted to the thermodynamic equilibrium concentrations of the water gas shift reaction, or to the use of high temperatures for the conversion of methane, considered as being necessary conditions according to the disclosures of the known art.

In fact, an object of the present invention relates to a process for the production of hydrogen which is based on the use of a redox solid which, by passage between two reaction zones, is reduced in the presence of a suitable reducing stream, preferably a hydrocarbon, in one of these and is re-oxidized by a suitable agent in the other, with the formation of the reduced form of the oxidizing agent.

A further characteristic of the process according to the invention is the use of $H_2O$ and $CO_2$ as oxidizing agents of the solid. This, in turn, is characterized in that it can exist in at least two forms, a more reduced form and a more oxidized form, which essentially differ in the oxygen content and in that it cyclically and reversibly passes from the more reduced form to the more oxidized form.

According to the present invention, hydrogen is therefore obtained by means of a process which comprises the following operations:

a) oxidation of a solid in a first reaction zone
b) passage of the oxidized form of the solid to a reaction zone into which a reducing stream is fed, and its reaction with said reducing stream
c) recovery of the reduced form of the solid and its feeding to the first reaction zone
d) heat supply, preferably effected during one of the operations (b) and (c).

The process may also comprise other operations, depending on the conversion degrees and selectivities of the reactions involved; hydrogen is therefore obtained by means of a process which comprises the following operations:

- oxidation of a solid in a first reaction zone; production of $H_2$ or CO depending on the oxidizing compound;
- passage of the oxidized form of the solid to a subsequent reaction zone in which the reduction of the solid takes place by its reaction with a hydrocarbon;

recovery of the reduced form of the solid and its feeding to the subsequent reaction zone;

sending of the gaseous phase produced during the reduction of the solid to a suitable separation section which allows the more or less complete separation of the complete combustion products ($CO_2$ and $H_2O$) from any possible non-converted hydrocarbon and from any possible by-products formed;

possible recycling of the above gaseous stream to the reaction zone in which the reduction of the oxide takes place and/or to a further reaction zone, to enable complete conversion of the above stream to complete combustion products ($CO_2$ and $H_2O$);

elimination from the cycle of the complete combustion products ($CO_2$ and $H_2O$) coming from the purification section.

Whereas the redox solid can be selected from a wide range of compounds, which will be described hereunder in the present invention, the oxidizing agent, according to the process of the present invention, may consist of $H_2O$, $CO_2$ or a mixture of the two; the re-oxidation of the solid with the oxidizing agent can be carried out in one step or by means of several steps, also comprising, in addition to the above oxidizing agents, the use of $O_2$, air or enriched air in at least one of these steps. If the oxidizing agent is not completely converted in the first reaction zone, the gaseous phase produced by this reaction zone can be sent to a cooling and separation train with the recovery and recirculation of the non-converted oxidizing agent to the same reaction zone.

Without entering into the mechanisms of the various reactions involved in the process of the present invention and, naturally, without limiting the scope thereof, the overall schemes (together with the various redox reactions) of the transformations effected with the above operations can be represented as follows, with reference to the use, as oxidizing agents, of $H_2O$ and $CO_2$, respectively, and methane as hydrocarbon fed to the above reduction zone.

$$2H_2O+CH_4 \rightarrow CO_2+4H_2 \quad 1)$$

$$3CO_2+CH_4 \rightarrow 4CO+2H_2O \quad 2)$$

In the first case there is the direct production of hydrogen, whereas in the second case it is necessary to resort to the traditional technologies which constitute a simple and effective means of using CO for the preparation of hydrogen: for example, by means of one or more shift conversion steps $$CO+H_2O \leftrightarrows CO_2+H_2$$

followed by the purification of $H_2$, according to the procedures described above.

In both cases 1) and 2), the process is endothermic and it is therefore advantageous for the process for the preparation of hydrogen to comprise, in addition to the three operations described above, an intermediate step to supply the necessary heat.

Referring again, for purely illustrative purposes, to the reactive transformation schemes, which presumably take place in the single reaction zones, schemes 1) and 2) above can be expressed as a result of the following reactions:

in the case of the use of $H_2O$ as oxidizing agent and oxides such as redox solids:

$$4Me_xO_y+4H_2O \rightarrow 4Me_xO_{y+1}+4H_2 \quad 3)$$

$$4Me_xO_{y+1}+CH_4 \rightarrow 4Me_xO_y2H_2O+CO_2 \quad 4)$$

Me representing the element and redox elements present in the solid, x and y being correlated to the valence and oxidation state of Me itself, with $x \geqq 1$ and $y \geqq 0$. In the case of the use of $CO_2$ as oxidizing agent:

$$4Me_xO_y+4CO_2 \rightarrow 4Me_xO_{y+1}+4CO \quad 5)$$

$$4Me_xO_{y+1}+CH_4 \rightarrow 4Me_xO_y+2H_2O+CO_2 \quad 6)$$

the same considerations being valid for Me, x and y.

The passage of the oxidized form of the solid, from 3 to 4 (or from 4 to 3) and from 5 to 6 (or from 6 to 5) respectively, is then carried out by means of an appropriate supply of heat which is consequently an essential operation of the process for the production of hydrogen according to the present invention: the heat can therefore be supplied directly, or indirectly, and it will be up to experts in the field to decide which specific procedure to adopt, any choice naturally being included in the scope of the present invention.

The heat can be supplied by means of combustion on the part of the hydrogen formed, or by the combustion of methane, natural gas or other hydrocarbons or even exploiting the heat which is developed by further oxidation of the solid with air.

Either part or all of the heat can be advantageously supplied in a separate reaction zone by means of the combustion with molecular oxygen ($O_2$) more or less diluted, of the partial combustion products and possible non-converted hydrocarbons present in the gaseous stream leaving the reaction zone where the solid is reduced.

Again, on the basis of his experience, the expert in the field will suggest and indicate the optimum conditions, also in relation to the reactions on which the process for the preparation of hydrogen, according to the present invention, is based.

Solids which can be used are those which, comprising at least one element Me, are distinguished by the fact that Me is selected from elements which have at least two different oxidation states, stable under the reaction conditions, which differ in the oxygen content and in that they are capable of cyclically passing from the more reduced form to the more oxidized form, and viceversa.

Solids containing one or more elements with the characteristics mentioned above can be used, as such or mixed with other elements which are not subject to redox reactions; the reactive phase thus obtained can, in turn, be used as such or suitably dispersed or supported on compounds such as silica, alumina or other pure oxides such as those of magnesium, calcium, cerium, zirconium, titanium, lanthanum, but also mixtures thereof.

Depending on the origin and purification processes with which these oxides are produced, there is typically the presence of rare-earth, such as praseodymium and terbium, in the case of cerium or lanthanum oxide, or hafnium in the case of zirconium oxide. Some of the elements which can be used as carrier or dispersing phase are also subject to redox reactions; this applies for example to cerium and praseodymium.

Minor components, called promoters or activators, may also be present in the solid; these typically belong to the group of noble metals such as Pt, Pd, Au and Rh, preferably in a quantity ranging from 0.01 to 2% by weight, or more generally transition metals, such as for example V, Cr, Mn, Ni, Nb, preferably in a quantity ranging from 0.1 to 15% by weight.

The redox elements (Me) which can be present in the solids to be used in the process according to the present invention are preferably selected from Ce, Pr, Ni, Fe, V, Mo, W, in the form of salts, oxides or anhydrides.

These redox elements can be present as binary compounds corresponding to the formula $$Me_xO_y \quad (7)$$

wherein Me is one or more elements selected from Ce, Fe, W, Ni;

or as compounds corresponding to the formula $$Me_xZ_zO_y \quad (8)$$

wherein Me is one or more elements selected from: Ce, Pr, Co, Ni, Fe, Mo and W,

Z is one or more elements selected from Ce, Zr, V and Mo; $x \geqq 1$, $y \geqq 0$ and $z \geqq 1$.

The use of solids containing Fe as the main redox element, preferably in a quantity ranging from 20 to 60% by weight, is particularly advantageous. Fe is, in turn, preferred in the process described, when it is present in the solid as binary compound, together with the binary compound of cerium and/or ternary compounds corresponding to formula (8) wherein Me=Fe and Z=Ce, more particularly $CeFeO_3$. Cr is particularly effective as promoter element of the mixtures of binary and ternary compounds based on Fe and Ce. The ternary compounds most widely used when Me=Mo or Me=V are selected from $CoMoO_4$, $NiMoO_4$, $Fe_2(MoO_4)_3$, $(NiCo)MoO_4$, $Cr_2(MoO_4)_3$, $MnMoO_4$ and $Ce_2(MoO_3)_3$, $CoVO_x$, $FeVO_x$, $NiVO_x$ and $CrVO_x$.

The preferred process configuration comprises the feeding of $H_2O$ to the first reaction zone (R1) with the formation of pure hydrogen. The production of $CO_2$ takes place in the second reaction zone (R2) and consequently the formation of the two gaseous species is not restricted by WGS equilibrium which conditions the consolidated steam reforming technology of natural gas. The stream leaving R2 is made up of water and $CO_2$, which, once separated from the water by condensation, is the only compound present in the outgoing stream. In this way, when the production of hydrogen is requested without the emission of $CO_2$, its removal is possible at much lower costs than in the case of steam reforming where water gas shift steps and $CO_2$ separation, by means of aminic washing, must be applied.

When the reduction step of the material produces CO and $H_2$, in addition to $CO_2$ and $H_2O$, a separation section can be introduced to make the process more flexible. This separation section can use various techniques known in the art, such as fractionated condensation, selective gas-liquid absorption, with absorption of both the physical and/or chemical type, selective (gas-solid) absorption, with regeneration by temperature or pressure variation (TSA, PSA) and the use of membranes. The presence of the separation section has the following advantages:

- of not necessarily having to obtain very high conversions and selectivities in the combustion of the hydrocarbon in the second reaction zone, consequently widening the range of redox solids which can be used;
- running the whole loop within relatively narrow temperature ranges and therefore with limited thermal exchange problems between the various zones, and running of the second reaction zone at relatively modest temperature levels.

The process is even more flexible in that the reduction of the solid can be effected with gases containing $CO+H_2$ from different sources. The separation section therefore also allows the gas leaving the reactor R2 to be used for this purpose, recirculating it to the reactor itself after the removal of $CO_2$ and $H_2O$. The gas can also be conveniently recycled to the reactor R3 and burned therein to complete the thermal balance. This stream can also be exploited as fuel to produce E.E. by means of a suitable gas turbine/E.E. generator or combustor/vapour production/vapour turbine/E.E. generator system.

The hydrocarbon which is fed to the reaction zone in which the solid is reduced, can be selected from several species belonging to this group of compounds: particular emphasis should be laid on the use of aliphatic hydrocarbons and in particular methane and natural gas even if other different reducing agents may be suitable for the purpose, such as the waste gases of chemical plants, for example.

In the case of the use of $CO_2$ as oxidizing agent, the CO which is formed in the first reaction zone can be used as such for chemical uses or it can be used for the preparation of hydrogen by means, as already mentioned, of one or more vapour shift conversion steps.

Also included in the scope of the present invention is the use, in the first oxidation phase, of an oxidizing agent consisting of a mixture of $H_2O$ and $CO_2$, in which case synthesis gas is obtained.

The separation section can use different separation techniques such as fractionated condensation, selective gas-liquid absorption, with absorption of both the physical and/or chemical type, selective (gas-solid) adsorption, with regeneration as a result of the temperature or pressure (TSA, PSA) and the use of membranes.

Further details can be obtained from reading the following examples which are provided for a better illustration of the present invention but do not limit its scope in any way.

EXAMPLE 1

With reference to the drawing in FIG. 1, R1 and R2 respectively represent the first reaction zone (production of $H_2$) and the second reaction zone (reduction of the oxide with methane), whereas R3 represents the supplementary thermal support unit in which hydrogen is used as fuel (indirect heat exchange).

Water is fed (line 1) to the first reaction zone (R1) and $H_2$ is produced (line 2). Methane is fed (line 3) to the second reaction zone (R2) and its combustion products are obtained: carbon dioxide and water (line 4). Hydrogen (line 5) and air (line 6) are co-fed to the supplementary thermal support unit (R3) and $H_2O$ and nitrogen (line 7) are obtained.

The scheme is completed by the transport lines which connect the three zones mentioned above and which convey the reduced solid leaving R2 to the supplementary thermal support unit R3 (line 9), the heated solid to the hydrogen production reactor (line 8) and the oxidized solid back to R2 (line 10).

In principle, the assumed reactions and relative reaction heat can be estimated as follows (The Thermodynamics of Organic Compounds—D. Stull, E. Westrum):

| | | |
|---|---|---|
| in R1 | $H_2O \Rightarrow H_2$ | $\Delta H$ = 57.8 kcal/mole |
| in R2 | $CH_4 \Rightarrow CO_2 + 2H_2O$ | $\Delta H$ = −191.7 kcal/mole |
| in R3 | $1/2\ O_2 + H_2 \Rightarrow H_2O$ | $\Delta H$ = −57.8 kcal/mole |
| in R1 | $MeO_x \Rightarrow MeO_{(x+1)}$ | $\Delta H$ = −X kcal/mole |
| in R2 | $MeO_{(x+1)} \Rightarrow MeO_x$ | $\Delta H$ = X kcal/mole |

wherein X is a characteristic linked to the chemical nature of the solid. On the basis of the known thermodynamic properties, such as the formation heat of the oxidized phase and reduced phase, in equilibrium with each other (Perry's Chem. Eng. Handbook), a list of elements and amounts of heat relating to the redox reactions to which they are subjected, can be identified, some of which are provided for illustrative purposes in Table 1 below.

Table 1 specifies the reaction relating to the redox element contained in the solid and the formation heat of the two forms identified under standard conditions: oxidized form (DHox) and reduced form (DHred).

It is known that a better definition of the heat absorbed/generated by the redox of the solid should also comprise the quantity of heat relating to the variation in the thermal capacity of the solid at a constant pressure for the temperature variation induced in the reagent mass; this latter quantity of heat, however, is normally modest with respect to the variation in the formation heat measured under standard conditions, and consequently the DH° indicated in Table 1 provides a sufficient approximation of the thermodynamic characteristic of the material and can therefore be used for calculating the weight and thermal balance described below. It should be pointed out however that this value is only close to the thermodynamic characteristic of the material when the element which forms the carrier or dispersing phase is not itself subject to redox reaction or does not react with the reduced and/or oxidized form of the redox element to form other phases or compounds with the relative development and/or absorption of formation heat which would be added to that of the redox element.

It should also be noted that the reactions indicated in Table 1 are theoretical and should be corrected by the real redox reaction advance factor under the experimental conditions used.

The availability of experimental measurements of the heat exchanged during the redox of the solid under the reaction conditions, which can be taken with instruments such as DSC (Differential Scanning Calorimeter) or DTA (Differential Thermal Analyzer), allows a better definition of the balance indicated below.

TABLE 1

| | Oxidized form | Reduced form | DHox kcal/mole | DHred kcal/mole | DH° kcal/mole |
|---|---|---|---|---|---|
| A | 2 $CeO_2$ = | 1 $Ce_2O_3$ + 0.5 $O_2$ | −247.9 | −434.9 | 60.9 |
| F | 1 $Fe_2O_3$ = | 2 FeO + 0.5 $O_2$ | −196.5 | −63.3 | 69.9 |
| G | 1 $Fe_3O_4$ = | 3 Fe + 2 $O_2$ | −265.8 | 0 | 265.8 |
| H | 1 $Fe_3O_4$ = | 3 FeO + 0.5 $O_2$ | −265.8 | −195 | 70.8 |
| I | 1 $MoO_3$ = | 1 $MoO_2$ + 0.5 $O_2$ | −178.1 | −140.8 | 37.3 |
| L | 1 NiO = | 1 Ni + 0.5 $O_2$ | −57.3 | 0 | 57.3 |
| M | 2 $PrO_2$ = | 1 $Pr_2O_3$ + 0.5 $O_2$ | −229.9 | −435.7 | 24.1 |
| P | 1 $V_2O_5$ = | 1 $V_2O_3$ + 1 $O_2$ | −370.9 | −291.3 | 79.6 |
| Q | 1 $WO_3$ = | 1 $WO_2$ + 0.5 $O_2$ | −201.4 | −140.9 | 60.5 |

It is therefore possible to establish a weight/thermal balance with reference to FIG. 1 which, assuming the validity of all the above approximations and all the unitary operations introduced, characterized by a 100% efficiency, can become self-consistent, from a thermal point of view, by balancing the overall endothermicity of reaction zones 1 and 2 with the supplementary thermal support unit.

For the weight balance, indicated in table 2 and specified with respect to the main components, the formation of 50 t/h of hydrogen (line 2) was taken as calculation base, together with the use of an element having the thermodynamic properties indicated in line 1 of Table 1, assuming that the oxide indicated is supported with 50% by weight of a carrier.

TABLE 2

| Line | 1 t/h | 2 t/h | 3 t/h | 4 t/h | 5 t/h | 6 t/h | 7 t/h | 8 t/h | 9 t/h | 10 t/h |
|---|---|---|---|---|---|---|---|---|---|---|
| $H_2$ | | 50 | | | 8.5 | | | | | |
| $H_2O$ | 450 | | | 225 | | | 76.9 | | | |
| $CO_2$ | | | | 275 | | | | | | |
| CO | | | | | | | | | | |
| M | | | | | | | | 3200 | 3200 | |
| MO | | | | | | | | | | 3600 |
| $N_2$ | | | | | | 222.4 | 222.4 | | | |
| $O_2$ | | | | | | 68.3 | | | | |
| $CH_4$ | | | 100 | | | | | | | |
| carrier | | | | | | | | 3200 | 3200 | 3200 |
| Total | 450 | 50 | 100 | 500 | 8.5 | 290.7 | 299.3 | 6400 | 6400 | 6800 |

From the data of Table 2 it can be seen that it is possible to obtain from 100 t/h of methane, a net production of hydrogen of 41.5 t/h, characterized by a 100% purity. The 41.5 t/h of $H_2$ are provided by the production of 50 t/h in reaction zone 1 and by the consumption of 8.5 t/h in the thermal support unit; contemporaneously there is the formation of a concentrated stream of $CO_2$ and $H_2O$ without inert products of 500 t/h, with the re-circulation of 6,400–6,800 t/h of solid between the 2 reaction zones.

It should therefore be noted that an advantageous aspect of the proposed process lies in the production of the reduction gases of the solid ($CO_2$ and $H_2O$) and in the production of $H_2$ in separate zones, thus considerably reducing separation and purification costs of the hydrogen.

If the thermodynamic characteristics of the solid are known, it is possible to estimate the thermal levels of the two reaction zones. Table 3 below indicates the temperatures relating to lines 8, 9 and 10 calculated for some DH° values. The calculations were effected without taking into consideration, in a first approximation, the sensitive heat of the gaseous streams and attributing the heat transport in the system to the movement of the solid alone, characterized by a specific heat (cp) equal to 0.25 cal/g/° C. In the situation described, the heat transport with the solid is prevalent, due to mass effect, with respect to the heat associated with the gaseous streams; the sensitive heat of the gaseous streams, moreover, can be recovered by means of adequate thermal exchanges between the in-going and out-going streams of the two reaction zones.

TABLE 3

| | DH° (kcal/mole) | Line 8 (° C.) | Line 9 (° C.) | Line 10 (° C.) |
|---|---|---|---|---|
| A | 37 | 700 | 565 | 399 |
| B | 56 | 700 | 657 | 691 |

TABLE 3-continued

| | DH° (kcal/mole) | Line 8 (° C.) | Line 9 (° C.) | Line 10 (° C.) |
|---|---|---|---|---|
| C | 61 | 600 | 539 | 618 |
| D | 70 | 600 | 443 | 778 |

It can be observed that with a variation in the heat exchanged by the solid, the thermal profile of the two reaction zones is modified, reaching for example, assuming the use of an element having the thermodynamic characteristics indicated in Table 3 line B, a substantially flat profile.

It should also be pointed out that the temperature of the whole hydrogen production cycle is normally lower that that typically used in present hydrogen production processes by steam reforming or autothermal reforming of methane, and this forms another advantageous aspect of the proposed process.

EXAMPLE 2

Figure 2:
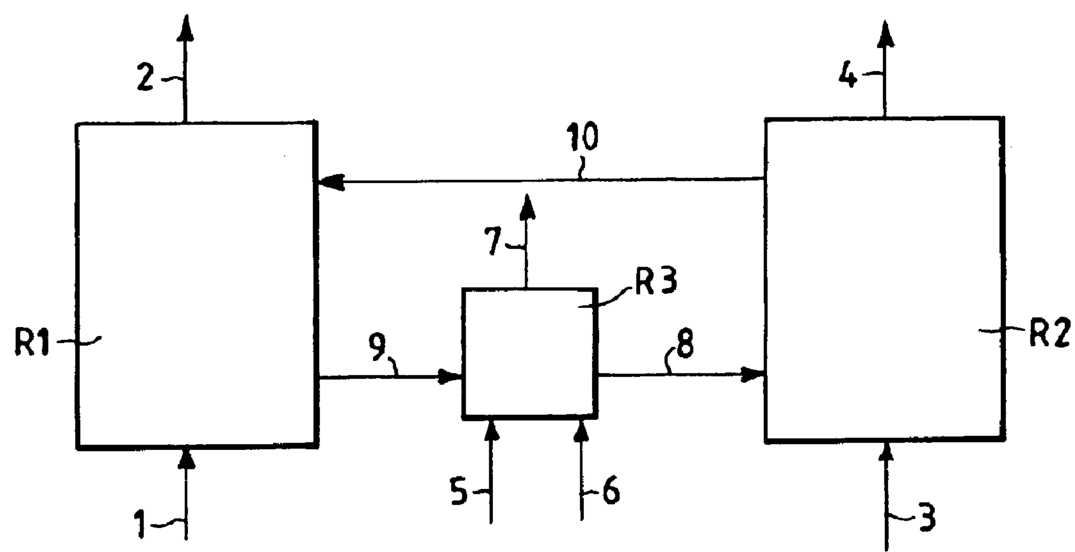
FIG. 2 shows a second embodiment of the process of the invention.

With reference to the drawing indicated in FIG. 2, R1 and R2 respectively represent the first reaction zone (production of $H_2$) and the second reaction zone (reduction of the oxide with methane), whereas R3 represents the supplementary thermal support unit in which the fuel used is methane as an alternative to hydrogen.

Water enters the first reaction zone (R1) (line 1) and $H_2$ is produced (line 2). Methane (line 3) is fed to the second reaction zone (R2) and its combustion products are obtained: carbon dioxide and water (line 4). Methane (line 5) and air (line 6) are co-fed into the supplementary thermal support unit (R3) and $H_2O$, carbon dioxide and nitrogen (line 7) are obtained.

The scheme is completed by the transport lines which connect the three zones mentioned above and which convey the reduced solid leaving R2 to the hydrogen production reactor (line 10), the oxidized solid to the supplementary thermal support unit R3 (line 9) and the heated solid again to the reactor R2 (line 8).

With the same assumptions as Example 1, the production of 50 t/h (line 2) requires 121 t/h of methane distributed between the reduction reaction (line 3) and the thermal support (line 5). 500 t/h of a stream consisting of $CO_2$ and $H_2O$ leave the reactor R2. The solid has a reversibly exchangeable oxygen content of about 6% by weight. The composition of the various streams is indicated in Table 4. The temperatures of the outgoing streams are 534° C. (line 8), 399° C. (line 9) and 700° C. (line 10), respectively.

EXAMPLE 3

With reference to the drawing indicated in FIG. 2, R1 and R2 respectively represent the first reaction zone (production of CO) and the second reaction zone (reduction of the oxide with methane), whereas R3 represents the supplementary thermal support unit in which methane is used as fuel.

$CO_2$ (line 1) enters the first reaction zone (R1) and CO is produced (line 2). Methane (line 3) is fed to the second reaction zone (R2) and its combustion products are obtained: $CO_2$ and $H_2O$ (line 4). Methane (line 5) and air (line 6) are co-fed into the supplementary thermal support unit (R3) and $H_2O$, carbon dioxide and nitrogen (line 7) are obtained.

For the calculation of the composition of the various streams, a production of 140 t/h of carbon monoxide was assumed, from which about 112,000 $Nm^3$ of hydrogen can be obtained by applying the conventional technologies.

With the same assumptions as Example 1, about 28 t/h of methane are required for the production indicated. The solid has a reversibly exchangeable oxygen content of about 6% by weight.

EXAMPLE 4

With reference to the drawing in FIG. 2, R1 and R2 respectively represent the first reaction zone (production of $H_2$) and the second reaction zone (reduction of the oxide with methane), whereas R3 represents the supplementary thermal support unit in which hydrogen is used as fuel.

Water is fed (line 1) to the first reaction zone (R1) and $H_2$ is produced (line 2). Methane is fed (line 3) to the second reaction zone (R2) and its combustion products are obtained: carbon dioxide and water (line 4). Hydrogen (line 5) and air (line 6) are co-fed to the supplementary thermal support unit (R3) and $H_2O$ and nitrogen (line 7) are obtained.

For the calculation of the composition of the various streams, a production of 150,000 $Nm^3$/h, equal to 13.4 t/h, of hydrogen was assumed. The solid has a reversibly exchangeable oxygen content of about 6% by weight.

The methane consumption is 37,500 $Nm^3$/h for a net production of 124,373 $Nm^3$/h of hydrogen, of which 25,627 $Nm^3$/h are sent to the thermal support unit. The composition of the streams is indicated in Table 4.

With the proposed scheme, the specific methane consumption, in terms of energy per volume of $H_2$, is equal to 2.56 Gcal for a net production of 1,000 Nmc of $H_2$, using a calorific value for the methane of less than 8,500 kcal/Nmc; in addition, the specific emission of $CO_2$ is equal to about 300 Nmc per 1,000 Nmc of $H_2$ produced. This latter value represents an advantageous aspect of the present process in terms of environmental effectiveness, as it is well below the typical values of $CO_2$ discharges into the environment of other known processes for the production of $H_2$. For example the steam reforming of methane is characterized by a specific emission of $CO_2$ which is typically higher than 360 Nmc per 1,000 Nmc of $H_2$ (Modern Production Technologies in Nitrogen 1997 CRU Publishing Ltd, pages 102–115).

TABLE 4

| Line | 1 Nmc/h | 2 Nmc/h | 3 Nmc/h | 4 Nmc/h | 5 Nmc/h | 6 Nmc/h | 7 Nmc/h | 8 t/h | 9 t/h | 10 t/h |
|---|---|---|---|---|---|---|---|---|---|---|
| $H_2$ | | 150000 | | | 25627 | | | | | |
| $H_2O$ | 150000 | | | 75000 | | | 25627 | | | |
| $CO_2$ | | | | 37500 | | | | | | |
| CO | | | | | | | | | | |
| M | | | | | | | | | | 857 |

TABLE 4-continued

| Line | 1 Nmc/h | 2 Nmc/h | 3 Nmc/h | 4 Nmc/h | 5 Nmc/h | 6 Nmc/h | 7 Nmc/h | 8 t/h | 9 t/h | 10 t/h |
|---|---|---|---|---|---|---|---|---|---|---|
| MO | | | | | | | | 964 | 964 | |
| $N_2$ | | | | | | 47654 | 47654 | | | |
| $O_2$ | | | | | | 12814 | | | | |
| $CH_4$ | | | 37500 | | | | | | | |
| carr. | | | | | | | | 857 | 857 | 857 |
| Total | 150000 | 150000 | 37500 | 112500 | 25627 | 60468 | 73281 | 1821 | 1821 | 1714 |

EXAMPLE 5 (COMPARATIVE)

Table 5 below indicates the energy consumption for various process configurations relating to the production of hydrogen from the steam reforming of natural gas, which can be applied to plants with an $H_2$ production capacity of up to 566,000 Nmc/h; the data provided comprise energy consumption due to the use of natural gas as fuel and as raw material (feed) and are specified for three configurations of typical processes (Modern Production Technologies in Nitrogen 1997 CRU Publishing Ltd. pages 102–115), where the basic case is characterized by a temperature at the outlet of the reformer of 850° C., a vapor ratio with respect to the carbon of 3.2 and a PSA unit efficiency of 86%. From the data provided it can be observed that an advantageous characteristic of the process proposed in the present invention is the specific energy consumption of natural gas equal to 2.56 Gcal/1,000 Nmc of $H_2$ (indicated in example 4), which is lower than the representative values of the steam reforming process specified in Table 5.

TABLE 5

| Consumpt. for 1000 Nmc of $H_2$ | Basic case | Basic case + low temperature shift conversion | Basic case + pre reformer |
|---|---|---|---|
| Feed (Gcal) | 3.15 | 3.02 | 3.15 |
| Fuel (Gcal) | 0.81 | 0.97 | 0.71 |
| Feed + Fuel (Gcal) | 3.96 | 3.99 | 3.85 |

EXAMPLE 6

An aliquot of a solid containing 61% of $Fe_2O_3$ and 39% of $CeO_2$ (1732) after oxidation in air at 800° C., was subjected in a thermobalance to a reduction cycle with 100% methane under isotherm temperature conditions at 780° C. The plot obtained was compared to those relating to aliquots of other solids with the same content of $Fe_2O_3$ but with 39% of $Al_2O_3$, $SiO_2$, MgO and $ZrO_2$, respectively.

Figure 3:
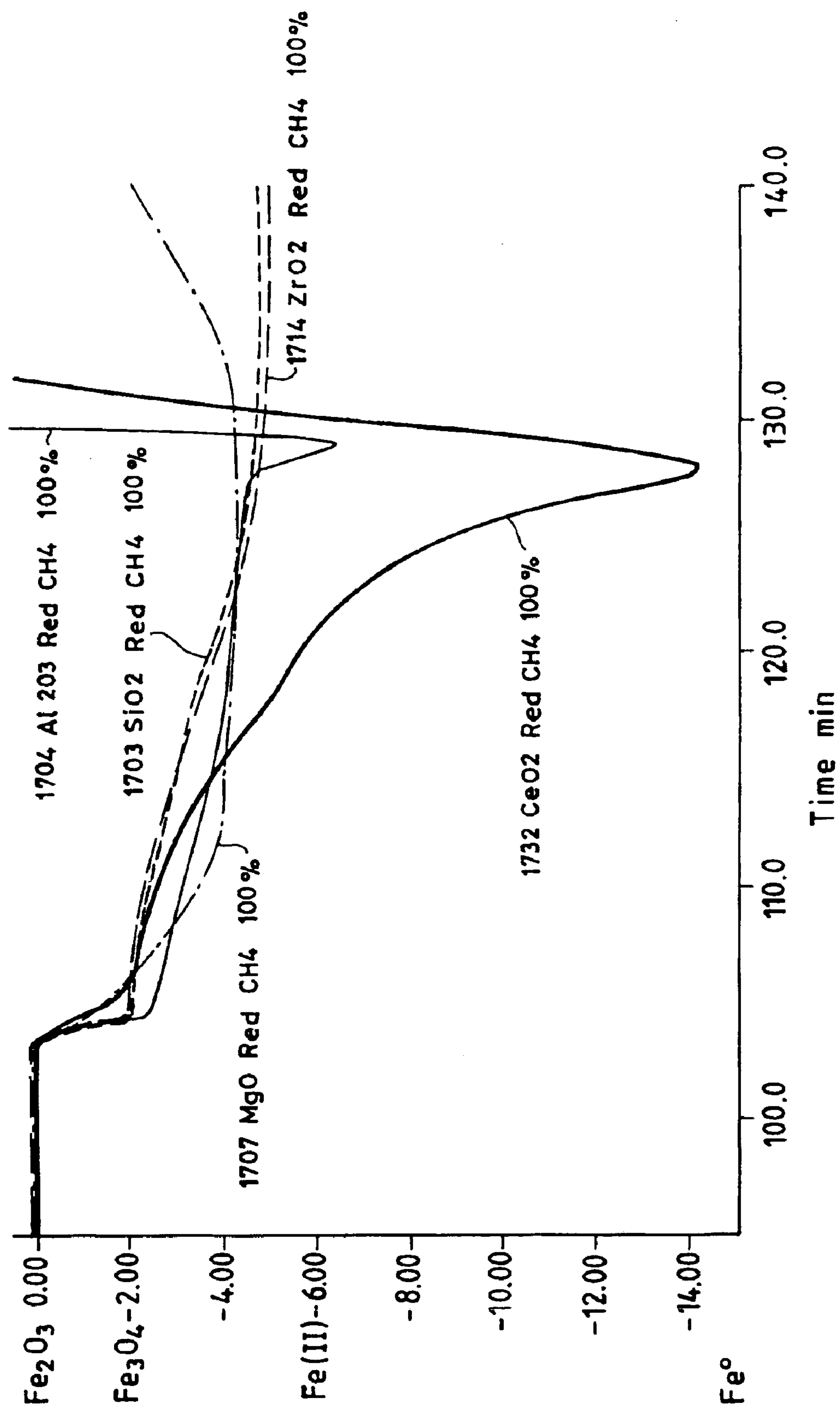
FIG. 3 shows a thermogravametric analysis of aliquots using solid oxides in a reduction cycle with 100% methane under isotherm temperature conditions at 780° C.

The comparison is indicated in FIG. 3, which shows the weight loss (oxygen released) in relation to the test time. The oxidized sample was flushed with nitrogen for 102.5 minutes, after which the stream on the sample was changed from nitrogen to methane.

The results obtained demonstrate that the solid which contains $CeO_2$, under the same conditions, reacts more rapidly and more effectively with methane with respect to solids containing other iron oxide dispersing agents.

EXAMPLE 7

6.6 g of a solid containing 61% of $Fe_2O_3$ and 39% of $CeO_2$ are charged into a fixed bed microreactor at 750° C. and atmospheric pressure with a space velocity equal to 150 (GHSV). The solid is subjected to the following experiment:

oxidation in air at 750° C., GHSV=150, time=60 min.;
flushing in nitrogen;
reduction in methane at 100%, at 750° C. and GHSV=150 for a period of 60 min.;
flushing in nitrogen;
oxidation in nitrogen saturated with water at 80° C., at 750° C. for 120 min.;
reduction in methane at 100%, at 750° C. and GHSV=150, for a period of 20 min.;
measuring a methane conversion of 19%.

EXAMPLE 8

A solid containing 61% of $Fe_2O_3$, 5% of $Cr_2O_3$, the remaining percentage being $CeO_2$ (1786), was subjected to the same experiment as the solid of example 7, obtaining a methane conversion of 26%.

The Cr forms a methane combustion promoter of the material based on iron and cerium.

EXAMPLE 9

7.5 g of a solid containing 50% by weight of $CoMoO_4$, the remaining percentage consisting of $CeO_2$, after calcination at 800° C. in muffle, are charged into a fixed bed microreactor and subjected to a reduction cycle with methane at 100%, at 750° C., GHSV=150, the reaction effluents being measured on line by means of gaschromatographic analysis. After about 260 minutes of reaction, the methane is converted at 22.5%; the reaction effluent is found to contain $CO_2$ equal to 6.5% vol., CO 8.9% vol., $H_2O$ 12.0% vol., $H_2$=18.7% vol., the remaining percentage being unreacted methane. At the end of the methane feeding, the solid is flushed with nitrogen for about 60 minutes, to eliminate the residual traces of methane and reaction products and subsequently, at the same temperature of 750° C., it is flushed with a stream of 30 ml/min of nitrogen which, before entering the reactor, passes through a saturator with water maintained at a temperature of 90° C. The presence of $H_2$ is found in the reactor effluent. The quantity of $H_2$ developed from the $H_2O$ produces an oxidation of the solid which corresponds to 1.7% by weight of oxygen acquired by the solid.

EXAMPLE 10

Figure 4:
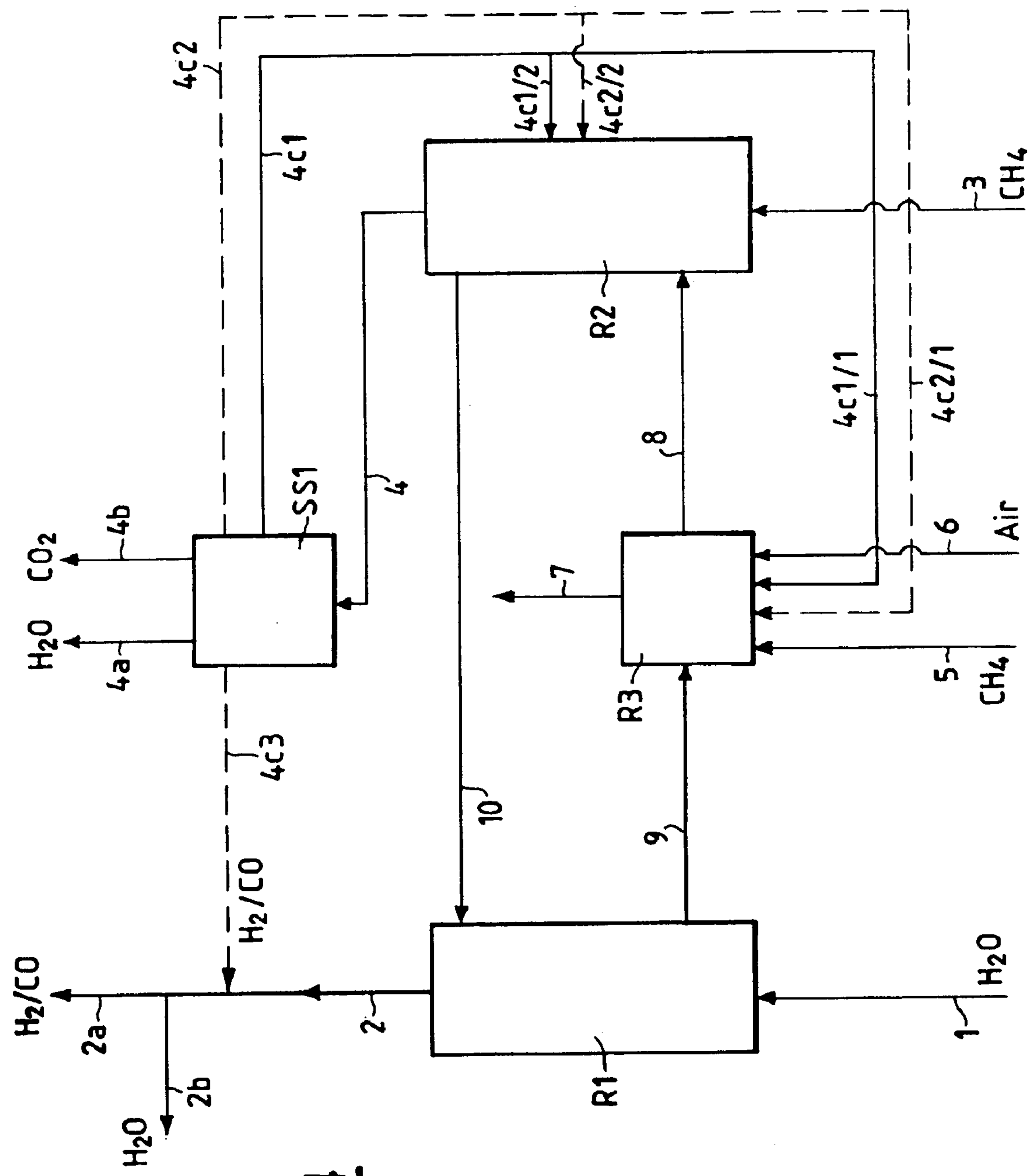
FIG. 4 shows a first apparatus to perform the process of the invention.

With reference to the drawing in FIG. 4, R1 and R2 respectively represent the first reaction zone (production of $H_2$) and the second reaction zone (reduction of the oxide with methane), R3 represents the complementary unit to the previous zones (heat generation) whereas SS1 represents the separation section.

Water is fed (line 1) to the first reaction zone (R1) and $H_2$ is produced (line 2). Methane is fed (line 3) to the second reaction zone (R2) and $CO_2$, $H_2O$, CO and $H_2$ are formed as combustion products (line 4). This stream is sent to the separation section SS1 from which the streams consisting of $H_2O$ (line 4*a*) and $CO_2$ (line 4*b*) are eliminated and the stream of $CH_4$+CO+$H_2$ (line 4*c*1) is recovered and distributed between the thermal support zone R3 and the above reactor R2 (line 4*c*1/1 and line 4*c*1/2 respectively). Air (line 6) is sent to the same unit R3, together with the above stream of $CH_4$+CO+$H_2$, obtaining $H_2O$, $CO_2$ and nitrogen (line 7). The scheme is completed by the transport lines which connect the three zones mentioned above and which convey the oxidized solid leaving the zone R1 to the supplementary thermal support unit R3 (line 9), the heated solid leaving this zone to the reduction zone R2 (line 8) and the reduced solid discharged therefrom back to the hydrogen production reactor (line 10).

The section SS1 consists in particular of (FIG. 4A): a) a partial condenser (E1) which allows the elimination of the water (line 4*a*) produced by the reduction operation carried out in R2; b) a membrane separation unit (M1), which allows the elimination of the $CO_2$ (line 4*b*) and recovery of the stream consisting of CO, $H_2$ and $CH_4$ present in the effluent from R2 (line 4*c*); the section does not comprise the AD1 equipment and exit lines required for the plant running.

The assumed reactions, relative reaction heat, formation heat of the oxidized and reduced phases, in equilibrium with each other, and other properties of the compounds in question, can be estimated as follows (The Thermodynamics of Organic Compounds—D. Stull, E. Westrum):

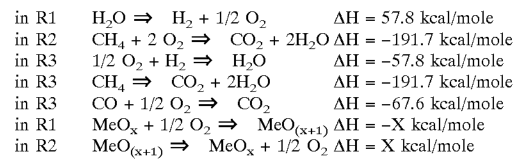

| | | |
|---|---|---|
| in R1 | $H_2O \Rightarrow H_2 + 1/2\ O_2$ | ΔH = 57.8 kcal/mole |
| in R2 | $CH_4 + 2\ O_2 \Rightarrow CO_2 + 2H_2O$ | ΔH = −191.7 kcal/mole |
| in R3 | $1/2\ O_2 + H_2 \Rightarrow H_2O$ | ΔH = −57.8 kcal/mole |
| in R3 | $CH_4 \Rightarrow CO_2 + 2H_2O$ | ΔH = −191.7 kcal/mole |
| in R3 | $CO + 1/2\ O_2 \Rightarrow CO_2$ | ΔH = −67.6 kcal/mole |
| in R1 | $MeO_x + 1/2\ O_2 \Rightarrow MeO_{(x+1)}$ | ΔH = −X kcal/mole |
| in R2 | $MeO_{(x+1)} \Rightarrow MeO_x + 1/2\ O_2$ | ΔH = X kcal/mole |

wherein X is a characteristic linked to the chemical nature of the solid.

It is therefore possible to establish a weight/thermal balance with reference to FIGS. 4/4A which can become self-consistent, from a thermal point of view, by balancing the overall endothermicity of reaction zones 1 and 2 with the supplementary thermal support unit 3, demonstrating that the section SS1 does not require heat supply.

Table 6 enclosed indicates the weight balance, specified with respect to the main components, the production of 100,000 $Nm^3$/h of hydrogen was taken as calculation base, together with the use of iron oxides whose thermodynamic properties are indicated in lines E and F of Table 1, assuming that the oxide indicated is supported with 40% by weight of a carrier (typically ceria).

It should be noted that the separation of most of the water present in the reactor effluent R1 (line 2) is effected by means of one of the traditional cooling systems with subsequent/contemporaneous separation of the gas phase (specifically line 2*a*: $H_2$) from the liquid phase (specifically line 2*b*: $H_2O$) generated by cooling; the complex in question is not indicated in FIG. 4 above.

Figure 4A:
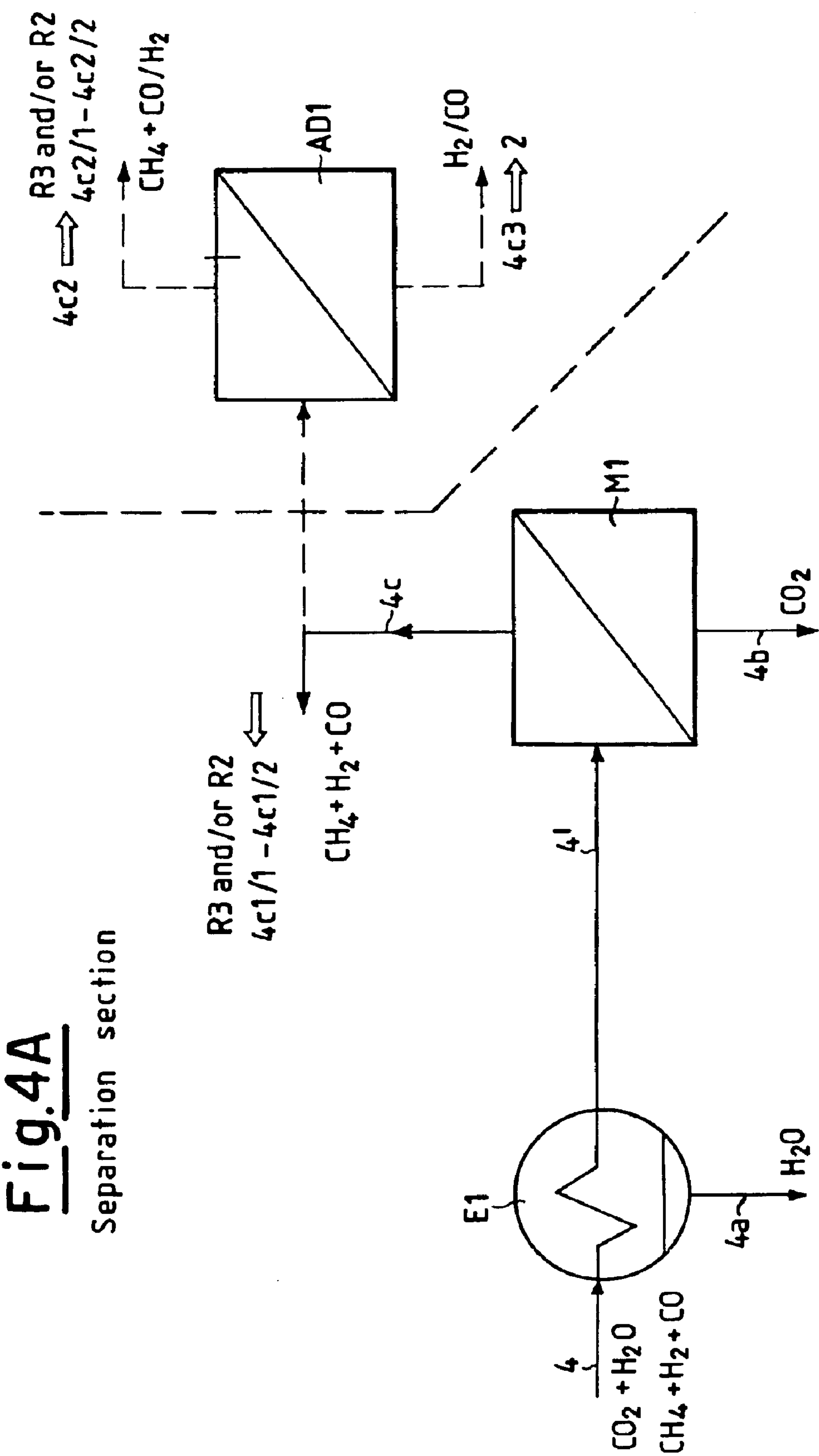
FIG. 4A shows the separation section SS1 in FIG. 4.

It should also be observed that a small quantity of water present in the effluent stream from R2 is also separated after cooling and a subsequent gas phase-liquid phase separation operation carried out on line 4*c* leaving M1, after the separation of $CO_2$. FIG. 4A does not schematically illustrate these operations; in Table 2, column 4*a* refers to the aqueous stream separated from the condenser E1, whereas column 4*a*' refers to the aqueous stream separated subsequently operating on line 4*c*. The process is carried out at 20 $kg/cm^2$.

If the thermodynamic characteristics of the solid in question are known, it is possible to estimate the thermal levels of the three reaction zones. The following table indicates the calculated temperatures relating to lines 8, 9 and 10:

a) R1⇒680° C.

b) R2⇒848° C.

c) R3⇒735° C.

It is also worth noting that the temperature of the whole production cycle considered is normally lower than that typically used in current hydrogen production processes by steam reforming or autothermal methane reforming, and this represents an advantageous aspect of the proposed process.

Figure 5:
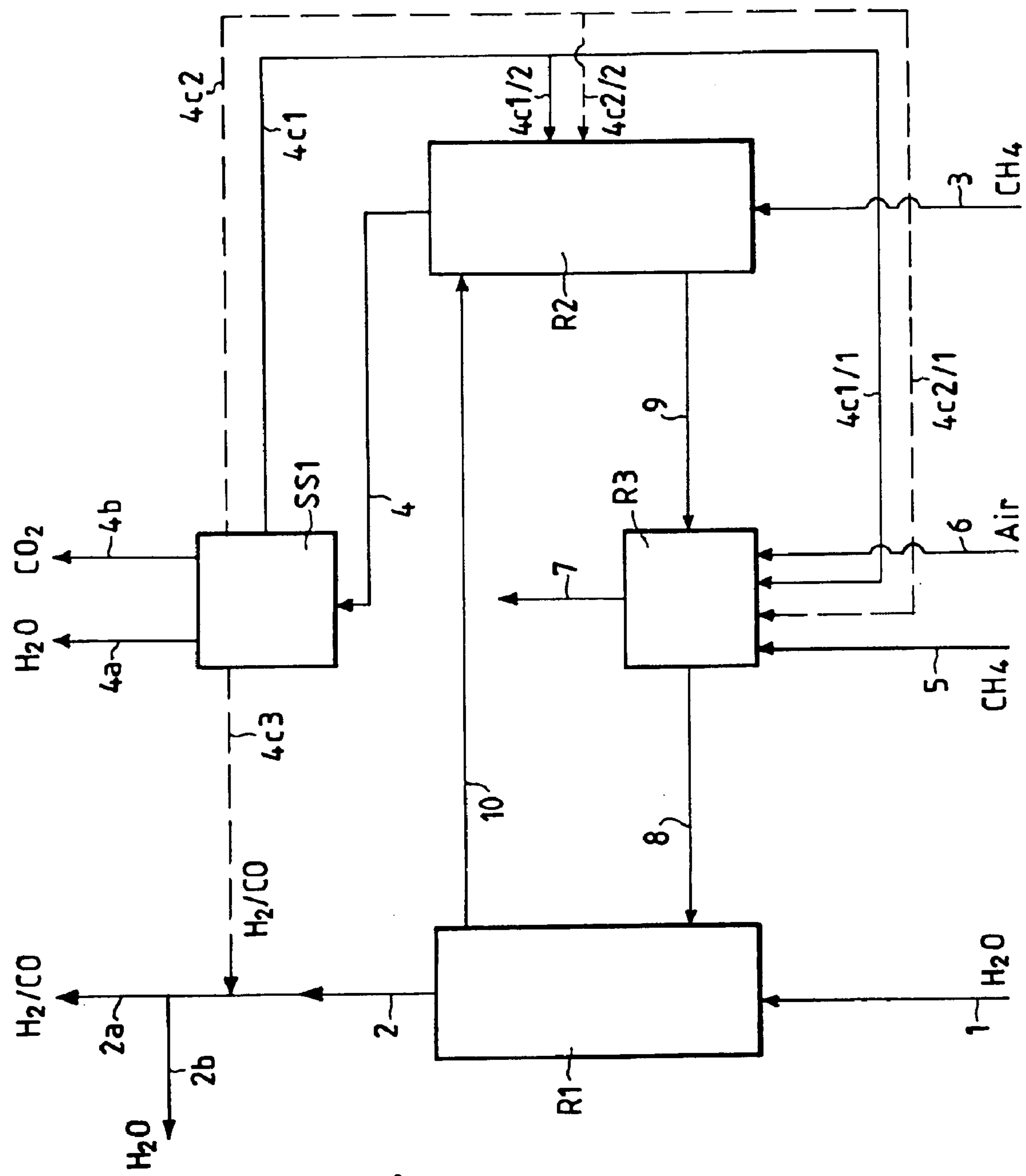
FIG. 5 shows a second apparatus to perform the process of the invention.

FIG. 5 provides an alternative operating scheme to the previous one illustrated and indicated in FIG. 1, in which the thermal support reaction zone R3 is situated downstream of R2: the solid effluent material from R3 feeds R1.

EXAMPLE 11

A solid containing 80% by weight of $Fe_2O_3$, the remaining percentage consisting of $ZrO_2$, prepared by co-precipitation, was subsequently impregnated with an aqueous solution containing dichlorideditetra-aminoplatinum to obtain a formulate with 0.1% by weight of Pt.

After calcination at 800° C. in muffle, 8 grams of solid were granulated, charged into a fixed bed microreactor and subjected to a reduction cycle with methane at 100%, at 750° C., GHSV=150, the reaction effluents being measured on line by gaschromatographic analysis. After about 10 minutes of reaction, the methane is 100% converted and the reaction effluent contains $CO_2$ and $H_2O$ and small quantities of CO/$H_2$. After about 30 minutes of reaction 60% of the methane is converted, at 60 minutes, the conversion is over 80%.

The introduction of Pt increases the methane combustion reaction rate. This appears particularly evident when comparing the conversion value of the material modified with Pt with the conversion obtained, under the same conditions, in Example 7.

TABLE 6

| Line | 1 (mol/h) | 2tot. (mol/h) | 2a (mol/h) | 2b (mol/h) | 3 + 4c1/2 (mol/h) | 4c1/2 (mol/h) | 3 (mol/h) |
|---|---|---|---|---|---|---|---|
| $H_2$ | | 4461.50 | 4461.50 | | 1414.34 | 1414.34 | |
| $H_2O$ | 5533.80 | 892.30 | 16.74 | 875.56 | 8.64 | 8.64 | |
| $CO_2$ | | | | | 46.68 | 46.68 | |
| CO | | | | | 707.17 | 707.17 | |
| M | | | | | | | |
| MO | | | | | | | |
| $N_2$ | | | | | | | |
| $O_2$ | | | | | | | |

TABLE 6-continued

| | | | | | | | |
|---|---|---|---|---|---|---|---|
| $CH_4$ | | | | | 2031.44 | 157.07 | 1874.36 |
| carrier | | | | | | | |
| Total (t/h) | 96449 | 25069 | 9296 | 15773 | 57460.00 | 27390 | 30070 |
| Line | 4 (mol/h) | 4a (mol/h) | 4a' (mol/h) | 4a + 4a' (mol/h) | 4b (mol/h) | 4c1 (mol/h) | 4c1/1 (mol/h) |
| $H_2$ | 1828.50 | | | | | 1828.50 | 414.16 |
| $H_2O$ | 3251.15 | 3233.96 | 6.03 | 3239.99 | | 11.16 | 2.53 |
| $CO_2$ | 1667.88 | | | | 1607.53 | 60.35 | 13.67 |
| CO | 914.25 | | | | | 914.25 | 207.08 |
| M | | | | | | | |
| MO | | | | | | | |
| $N_2$ | | | | | | | |
| $O_2$ | | | | | | | |
| $CH_4$ | 203.07 | | | | | 203.07 | 46.00 |
| carrier | | | | | | | |
| Total (t/h) | 164531 | 58.260 | 109 | 58369 | 70747 | 35410 | 8020 |
| Line | 4c1/2 (mol/h) | 5 (mol/h) | 6 (mol/h) | 7 (mol/h) | 8 (mol/h) | 9 (mol/h) | 10 (mol/h) |
| $H_2$ | 1414.34 | | | | | | |
| $H_2O$ | 8.64 | | | 508.68 | | | |
| $CO_2$ | 46.68 | | | 266.74 | | | |
| CO | 707.17 | | | | | | |
| M | | | | | | | |
| MO | | | | | | | |
| $N_2$ | | | 6577.94 | 6577.94 | | | |
| $O_2$ | | | 1248.57 | 23058 | | | |
| $CH_4$ | 157.07 | | | | | | |
| carrier | | | | | 23318.03 | 23318.03 | 23318.03 |
| Total (t/h) | 27390 | — | 240220 | 212550 | 3604776 | 3569086 | 3497706 |

What is claimed is:

1. A process for the production of hydrogen and carbon dioxide comprising:

a) oxidizing a solid in a first reaction zone to produce hydrogen;

b) passing the oxidized solid to a second reaction zone into which a reducing stream comprising hydrocarbon as reductant is fed and reacting the oxidized solid with the hydrocarbon to produce carbon dioxide;

c) recovering the reduced solid and feeding it to the first reaction zone;

d) wherein heat is supplied by use of a supplementary thermal support unit situated between the two reaction zones, the heat being supplied by using the heat which develops due to the further oxidation of the solid with air.

2. The process of claim 1, wherein the heat is supplied during one of the two operations (b) and (c).

3. The process of claim 1, wherein the solid is reacted in the first reaction zone with an agent selected from the group consisting of $H_2O$, $CO_2$, and mixtures thereof.

4. The process of claim 3, wherein the solid is reacted in the first reaction zone with $H_2O$.

5. The process of claim 1, wherein the solid to be oxidized in the first reaction zone comprises at least one element having at least two different oxidation states, stable under the reaction conditions.

6. The process of claim 5, wherein the solid, in the two different oxidation states is further characterized by different amounts of oxygen and enthalpy and is capable of cyclically and continuously passing from the reduced form to the oxidized form, and vice versa.

7. The process of claim 6, wherein at least one redox element is present in the solid as a binary compound corresponding to the formula $$Me_xO_y; \quad (I)$$

wherein Me is selected from the group consisting of Ce, Fe, W and Ni;

or as a compound corresponding to the formula $$Me_x, Z_zO_y, \quad (II)$$

wherein Me is one or more elements selected from group consisting Ce, Pr, Co, Ni, Fe, Mo and W;

Z is one or more elements selected from the group consisting of Ce, Zr, and Mo;

$x \geqq 1$, $y \geqq 0$ and $z \geqq 1$.

8. The process of claim 7, wherein Me is Fe.

9. The process of claim 8, wherein the Fe is present in the solid in a quantity ranging from 20 to 60% by weight.

10. The process of claim 9, wherein the Fe is present in the solid as a binary compound together with a binary compound of cerium and/or a compounds corresponding to formula (I) or (II), wherein ME is Fe and Z is Ce.

11. The process of claim 10, wherein the compound corresponding to formula (I) is $Fe_2O_3$.

12. The process of claim 8, wherein the solid also contains a metal as promoter selected from the group consisting of Pt, Pd, Au an Rh.

13. The process of claim 12, wherein the promoter is in a percentage ranging from 0.01 to 2% by weight.

14. The process of claim 7, wherein the solid also contains a transition metal as promoter selected from the group consisting of Cr, Mn, Nb and V.

15. The process of claim 14, wherein the promoter is in a percentage ranging from 0.1 to 15% by weight.

16. The process of claim 11, wherein chromium is present as promoter.

17. The process of claim 7, wherein the redox element thus obtained can be used alone, or dispersed or supported on compounds selected from the group consisting of silica, alumina, oxides of magnesium, calcium, cerium, zirconium, titanium, lanthanum, and mixtures thereof.

18. The process of claim 7, wherein the redox element is present in a quantity ranging from 20 to 80% by weight with respect to the compound which forms the carrier or the dispersing phase.

19. The process of claim 1, wherein the hydrocarbon is CH4.

20. The process according to claim 1, comprising: sending the gaseous phase produced during the reduction of oxidized solid to a separation section which allows the separation of the complete combustion products ($CO_2$ and $H_2O$) from any non-converted hydrocarbon;

optionally recycling the gaseous phase to the second reaction zone in which the reduction of the oxide takes place and/or to a further reaction zone, to enable complete conversion of the gaseous phase to provide complete combustion products ($CO_2$ and $H_2O$); and eliminating from the cycle the complete combustion products ($CO_2$ an $H_2O$) coming from a purification section.

21. The process of claim 1, wherein the reducing stream consists essentially of hydrocarbon.

* * * * *